United States Patent
Hall

(10) Patent No.: US 9,352,753 B2
(45) Date of Patent: May 31, 2016

(54) CAMERA DOLLY TRACK ASSEMBLY

(71) Applicant: AZGrip.com LLC, Queen Creek, AZ (US)

(72) Inventor: Michael W. Hall, Queen Creek, AZ (US)

(*) Notice: Subject to any disclaimer, the term of this patent is extended or adjusted under 35 U.S.C. 154(b) by 64 days.

(21) Appl. No.: 14/244,708

(22) Filed: Apr. 3, 2014

(65) Prior Publication Data

US 2014/0299013 A1 Oct. 9, 2014

Related U.S. Application Data

(60) Provisional application No. 61/808,408, filed on Apr. 4, 2013.

(51) Int. Cl.

| | |
|---|---|
| *E01B 25/24* | (2006.01) |
| *E01B 5/02* | (2006.01) |
| *B61B 13/00* | (2006.01) |
| *E01B 23/02* | (2006.01) |
| *F16M 11/04* | (2006.01) |
| *F16M 11/42* | (2006.01) |
| *B61B 3/00* | (2006.01) |

(52) U.S. Cl.
CPC . *B61B 13/00* (2013.01); *B61B 3/00* (2013.01); *E01B 23/02* (2013.01); *F16M 11/043* (2013.01); *F16M 11/425* (2013.01)

(58) Field of Classification Search
CPC .............. E01B 5/00; E01B 5/02; E01B 5/04; E01B 25/00; E01B 25/02; E01B 25/04; E01B 25/28
USPC .......... 104/106–111; 238/122, 125–127, 130, 238/134, 151, 175
See application file for complete search history.

(56) References Cited

U.S. PATENT DOCUMENTS

| | | | | |
|---|---|---|---|---|
| 7,997,207 B2* | 8/2011 | Hess | ......................... | B66C 7/14 |
| | | | | 104/106 |
| 2005/0051048 A1* | 3/2005 | Broek | ..................... | B25H 5/00 |
| | | | | 104/106 |

* cited by examiner

*Primary Examiner* — R. J. McCarry, Jr.
(74) *Attorney, Agent, or Firm* — Thomas W. Galvani, P.C.; Thomas W. Galvani

(57) ABSTRACT

A support for a camera dolly comprising spaced-apart first and second rails comprised of longitudinal rail members. The first rail has a first seam between its rail members, and the second rail has a second seam between its rail members. The first seam in the first rail is directly opposed from a corresponding second seam in the second rail. The first and second seams have first and second leading edges formed at crowns on the first and second rails, and the leading edge of the first seam is offset longitudinally with respect to the leading edge of the corresponding second seam.

20 Claims, 5 Drawing Sheets

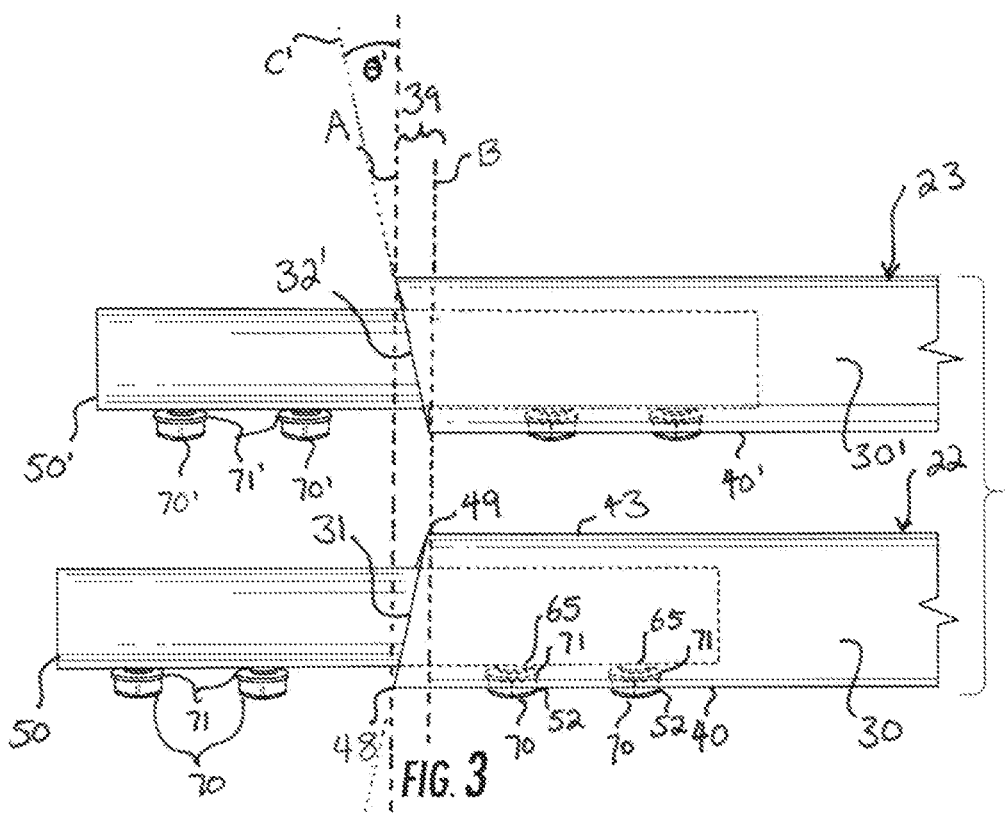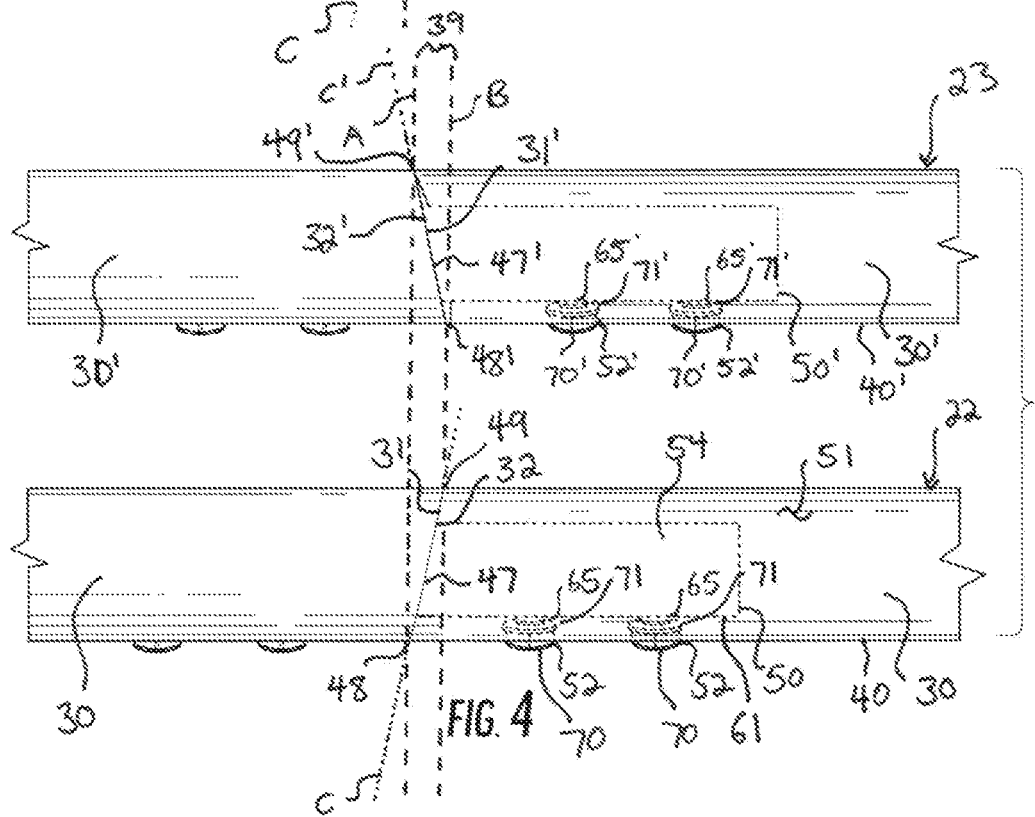

CAMERA DOLLY TRACK ASSEMBLY

CROSS-REFERENCE TO RELATED APPLICATIONS

This application claims the benefit of U.S. Provisional Application No. 61/808,408, filed Apr. 4, 2013, which is hereby incorporated by reference.

FIELD OF THE INVENTION

The present invention relates generally to camera equipment, and more particularly to tracks for supporting and guiding camera equipment.

BACKGROUND OF THE INVENTION

Video cameras, such as those used in professional media production settings, are highly sensitive pieces of equipment that must frequently be moved during filming to capture specific cinematographic shots. Video cameras respond to the slightest movement, and often do so in uncertain or undesirable ways. For that reason, the motion picture industry has developed many techniques and tools for stabilizing a camera during motion to reduce the undesirable effects of ancillary movements.

The motion picture industry has produced numerous types of tracks for moving a video camera smoothly from a first point to a second point. These tracks typically consist of two opposed, elongate rails secured to opposed bases. A chassis or dolly rides the rails between the bases on wheels or feet that glide over the rails of the track, and the video camera is mounted to the dolly.

For short runs, a track constructed of a single span of rails is ideal. However, cameras must often be moved longer distances. For instance, a shot that follows a surfer running down a beach and into the water may require that the camera move with the surfer fifty feet or more. A track is typically assembled along that distance to produce a stable, smooth, moving shot down the beach. In situations where the camera moves more than a short distance, a track assembly is constructed from many rail members coupled together in series. However, the junction between the rail members often is uneven, and as the camera dolly rolls over the junction, the dolly may be jarred or may vibrate, causing the camera to shake slightly. That shake will be translated permanently to the film. If the vibration in the filmed scene can be fixed, it will have to be reduced or eliminated in post production, which can be time-consuming and expensive. An improved track for a camera dolly is needed.

SUMMARY OF THE INVENTION

According to the principle of the invention, a camera dolly track assembly includes spaced-apart, opposed first and second rails each having a rolling surface for supporting a camera dolly. Each rolling surface includes two divergent faces depending from a common crown extending a complete length of each rail. The rolling surfaces are severed by seams between the rail members. Each seam defines a plane aligned obliquely with respect to the rolling surface, such that when the camera dolly rolls over the seam, wheels of the camera dolly encounter the seam at different moments, thereby reducing the impact or jarring to the camera dolly.

BRIEF DESCRIPTION OF THE DRAWINGS

Referring to the drawings:

FIG. 3 is a side perspective view of two of the rail members of the rails of FIG. 1 fixed with a coupler and unattached to neighboring rail members;

FIG. 4 is similar to FIG. 3, but illustrates neighboring rail members fixed on the coupler and juxtaposed with the two rail members, forming seams;

DETAILED DESCRIPTION

Figure 1:
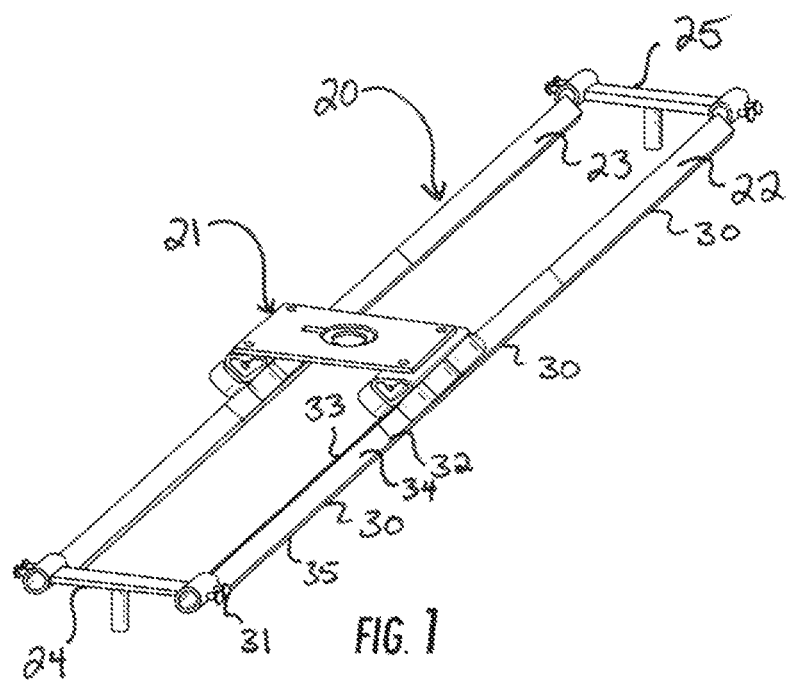
FIG. 1 is a top perspective view of a camera dolly track assembly constructed and arranged according to the invention, including two rails constructed of rail members extending between opposed base assemblies, and a camera dolly supported on the rails.

Reference now is made to the drawings, in which the same reference characters are used throughout the different figures to designate the same elements. FIG. 1 illustrates a camera dolly track assembly 20 constructed and arranged according to the principle of the invention, and carrying a dolly 21 for supporting a camera. The track assembly 20 includes two opposed, spaced-apart rails 22 and 23 extending between two opposed base assemblies 24 and 25. The rails 22 and 23 provide a smooth rolling surface for carrying the dolly 21 to ensure that a camera supported on the dolly 21 moves without interruption or disturbance, thus providing a smooth filming environment.

The rails 22 and 23 are identical in every respect, other than location and orientation, and as such, only the rail 22 will be described, with the understanding that the discussion of the rail 22 applies equally to the rail 23, but for location and orientation characteristics which are separately described. Further, the various elements and structural features of the rail 23 will carry the same reference characters as those of the rail 22, but will be designated with a prime symbol ("'") so as to identify and distinguish the elements and features of the rail 23 from those of the rail 22. In some cases, reference to the elements and features of the rail 23 may be made where clarity of the FIG. makes such reference easier. The rail 22 includes several rail members 30 coupled together in series, and only one rail member 30 will be referred to for simplicity.

Figure 2:
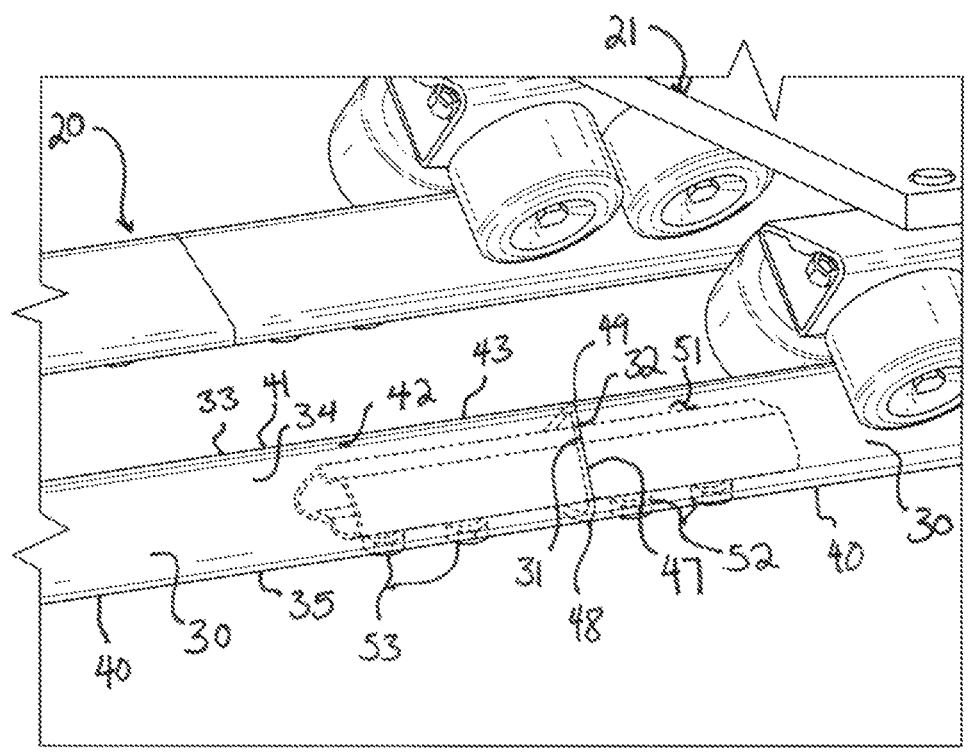
FIG. 2 is an enlarged side perspective view of seams formed between the rail members of the rails of FIG. 1, with wheels of the camera dolly just above.

The rail member 30 is constructed of a material or combination of materials have rigid, strong, rugged, and durable material characteristics, which can be ground or applied with a smooth finish, such as metal. The rail member 30 has opposed ends 31 and 32 and three outward faces 33, 34, and 35 extending between the ends 31 and 32. The outward faces 33 and 34 are upward faces which carry the dolly 21 rolls, and the outward face 35 is a downward face, and is formed with fastening structures for coupling to the other rail members 30 and to the base assemblies 24 and 25. As seen in FIG. 2, the rail member 30 is prismatic and has a generally triangular cross-section. The outward face 35 is formed on a bottom 40 of the rail member 30, and the outward faces 33 and 34 extending up from the bottom 40 are formed on sides 41 and 42, respectively, of the rail member 30. The sides 41 and 42 of the rail member 30 meet at a common, elongate crown 43 at the top of the rail member 30 which extends completely along the rail member 30 between the ends 31 and 32.

Still referring to FIG. 2, an oblique seam 47 is formed between the rail members 30. The seam 47 is formed between the end 31 of one rail member 30 and the opposing end 32 of an opposing rail member 30. The seam 47 extends from a trailing edge 48, located at the bottom 40 of the rail member 30, upward at an angle to a leading edge 49 located at the crown 43 of the rail member 30.

FIG. 3 further illustrates two ends 31 and 32 of rail members 30 in both the rails 22 and 23. FIG. 3 is a side perspective view directed onto and slightly above both the rails 22 and 23. At the end 31 of the rail member 30 in the rail 22, the bottom 40 of the rail member 30 projects further away from the rail member 30 than the crown 43, defining the location of the trailing edge 48 (though the trailing and leading edges 48 and 49 are part of the seam 47 formed by juxtaposed rail members 30, it should be understood that the location of the trailing edge 48 is still clearly shown in FIG. 3 even with the presence of only rail member 30, and that the actual seam 47 is shown in FIG. 3). The trailing edge 48 lies in a plane A extending through both of the rails 22 and 23 vertically with respect to those rails 22 and 23. The seam 47 extends from the trailing edge 48 to the leading edge 49 at the crown 43 of the rail member 30. The leading edge 49 lies in a plane B extending through both of the rails 22 and 23 vertically with respect to those rails 22 and 23. The planes A and B, both shown in FIG. 3 in broken line as extending into and out of the page, are parallel to each other. The planes A and B bound and define a longitudinal seam zone 39 for both of the rails 23 and 22, in which the seam 47 is entirely disposed and snugly confined.

The end 31 is angled with respect to the planes A and B, which each extend through the rail member 30 transverse to the rail member 30. The end 31 is aligned at an angle θ to the planes A and B, as seen in FIG. 3. Angle θ is approximately fifteen degrees, and is preferably between ten and twenty degrees with respect to the planes A and B, resulting in the end 31 being oblique to the rail member 30 at an angle of preferably between approximately seventy and eighty degrees. The end 32' of the rail member 30' of the rail 23 in FIG. 3 likewise forms an angle θ' with the planes A and B.

FIG. 3 shows two ends 31 and 32' of the rails 22 and 23, respectively with uncoupled rail members 30 and 30'. FIG. 4, on the other hand, shows the rails 22 and 23 with coupled rail members 30 and 30', forming the seams 47 and 47' between the rail members 30 and 30, between the rail members 30' and 30', respectively, as they would typically arranged to form the track assembly 20 of FIG. 1. Again referring primarily to the rail 22, the rail members 30 are coupled end 31 to end 32 in series to form the rail 22, as shown in FIG. 4. Rails 22 and 23 of varying length can be built by coupling rail members 30 in series together, and shorter or longer rails 22 and 23 can be built as the situation demands. The rail members 30 are coupled with couplers 50 which are inserted into the ends 31 and 32 of the rail members 30 and hold rail members 30 securely in alignment with respect to each other.

The seam 47 is formed between the ends 31 and 32 and is disposed across the rail 22 through the longitudinal seam zone 39 in a first direction in a plane C defined by the seam 47. The plane C is shown in broken line in FIGS. 3 and 4. The seam 47' is formed between the ends 31' and 32' and is disposed across the rail 22 through the longitudinal seam zone 39 in a second direction in a plane C' defined by the seam 47'. The plane C' is also shown in broken line in FIGS. 3 and 4. The seams 47 and 47' are directly opposed from each other on the rails 22 and 23, though the seams 47 and 47's are oriented in different first and second directions. The planes C and C' are transverse, or oblique, with respect to each other and intersect each other at an angle two times angle θ, since the plane C is aligned at angle θ with respect to the plane A and the plane C' is aligned at equal and opposite angle θ' with respect to the plane B, as shown in FIGS. 3 and 4. Thus, the trailing edges 48 and 48' are offset longitudinally with respect to each other, and the leading edges 49 and 49' are also offset longitudinally with respect to each other.

Referring back to FIG. 2, the rail member 30 is formed with a hollow interior 51 that extends completely through the rail member 30 between and through the ends 31 and 32. The interior 51 is generally triangular and is sized to receive the coupler 50, shown in FIGS. 5, 6, and 7. The interior 51 is bound by two upper inner surfaces and a lower inner surface. Two threaded holes 52 extend through the bottom 40 of the rail member 30 from the outward face 35 through the lower inner surface proximate to the end 31, and two threaded holes 53 extend through the bottom 40 from the outward face 35 through the lower inner surface proximate to the end 32.

Figure 5:
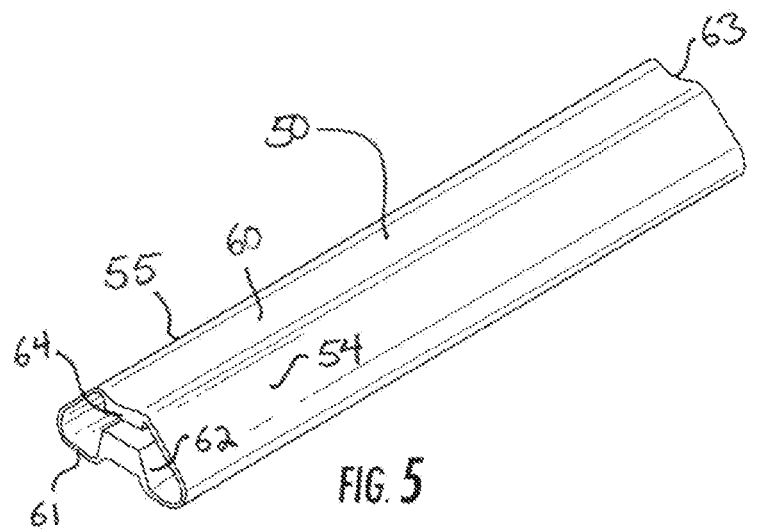
FIGS. 5, 6, and 7 are top perspective, bottom perspective, and front elevation views, respectively, of the coupler of FIG. 3.
Figure 6:
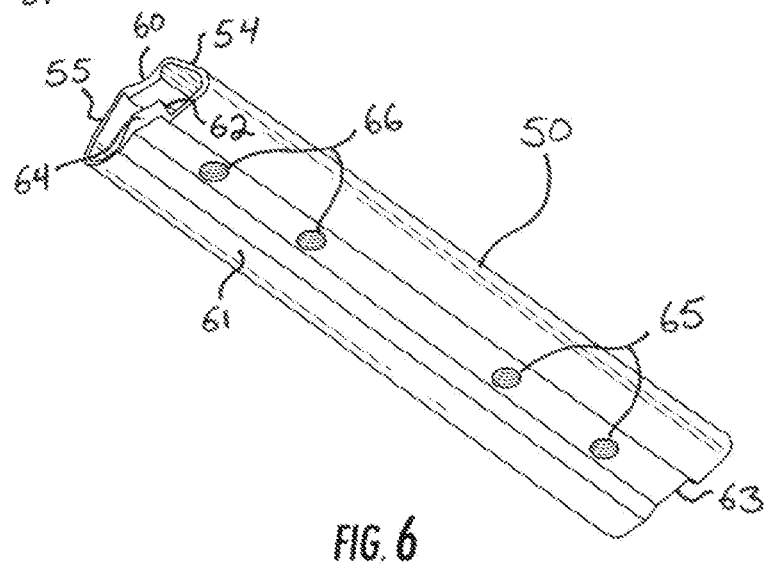
Figure 7:
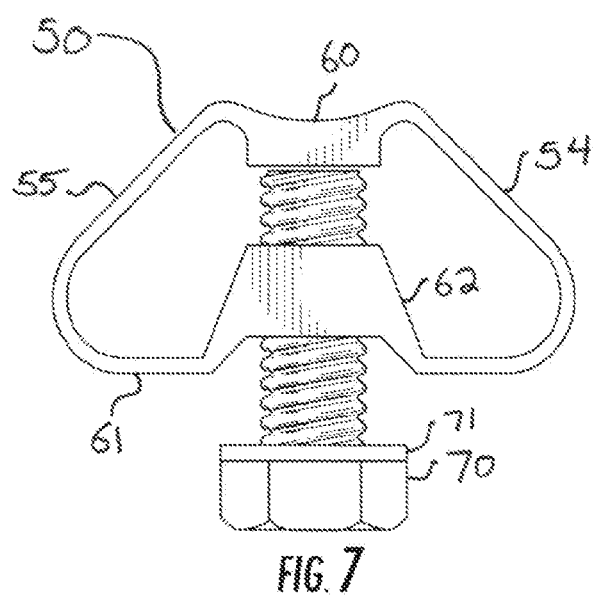

Referring now to FIGS. 5, 6, and 7, the coupler 50 is shown in top perspective, bottom perspective, and front elevation views, respectively. The coupler 50 secures the end 31 of one rail member 30 to the end 32 of another, neighboring, rail member 30 securely and precisely. The coupler 50 is elongate and generally triangular prismatic, having two upper faces 54 and 55 which meet and join along a depressed top 60, and a lower face 61 formed with an inner rib 62 extending along the coupler 50. The top 60 and the inner rib 62 are reinforced and thicker than the remainder of the coupler 50, providing axial strength and rigidity to the coupler 50. The coupler 50 has opposed ends 63 and 64, and two sets of threaded holes 65 and 66 are formed completely through both the lower face 61 and the inner rib 62 proximate to the ends 63 and 64, respectively. The coupler 50 is constructed of a material or combination of materials having rigid, durable material characteristics, and which can be smoothed to a fine finish, such as metal.

Referring to both FIGS. 3 and 7, to couple the rail members 30 together, the coupler 50 is first inserted into one end 31 of the rail 22, and the holes 65 in the coupler 50 are aligned with the holes 52 in the rail member 30. The upper faces 54 and 55 of the coupler 50 are received in juxtaposition against the upper inner surface of the interior 51 of the rail member 30, and the lower face 61 of the coupler 50 is received in juxtaposition against the lower inner surface of the interior 51 of the rail member 30. In this way, the coupler 50 has a loose press fit inside the rail member 30. Threaded bolts 70 are then rotatably applied and threadably engaged to the aligned holes 65 and 52, and a shank of each bolt 70 extends into, through, and past the inner rib 62 of the coupler 50 until the shank contacts the top 60 of the coupler 50. As seen in FIG. 7, the bolt 70 carries a washer 71 encircling the shank proximate to a head of the bolt 70, and, as seen in FIG. 3, the washer 71 contacts the bottom 40 of the rail member 30. Continued application of the bolt 70 through the holes 65 and 52 causes the washer 71 to tighten against the bottom 40 and urges the shank into the top 60 of the coupler 50, causing the coupler 50 to expand against the rail member 30. The rail member 30 is constructed of a rigid, strong, rugged, and durable material or materials, and as such, resists expansion. Expansion of the coupler 50 against the rail member 30 forms a tight press fit between the coupler 50 and the rail member 30, so that the rail member 30 is secured on the coupler 50.

Referring now to FIG. 4, an end 32 of another rail member 30 is then similarly secured on the coupler 50, with end 31 received in flush contact in juxtaposition with the end 32, forming the seam 47. At the seam 47 between the ends 31 and 32, the crowns 43 of each rail member 30 are aligned longitudinally, the bottoms 44 are aligned and parallel, and the sides 41 and 42 are aligned and parallel. The coupler 50 tightly binds the ends 31 and 32 together and tightly binds the rail members 30 together. In this manner, two or more rail members 30 are joined to form the rail 22.

Figure 8:
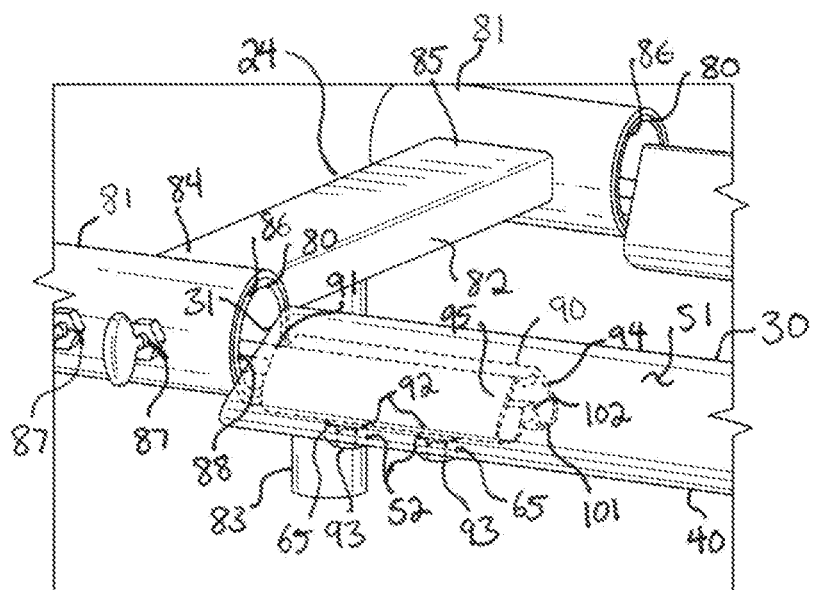
FIG. 8 is a side perspective view of the rails of FIG. 1 secured on the base assembly, showing couplers within the rails partially in broken line.
Figure 9:
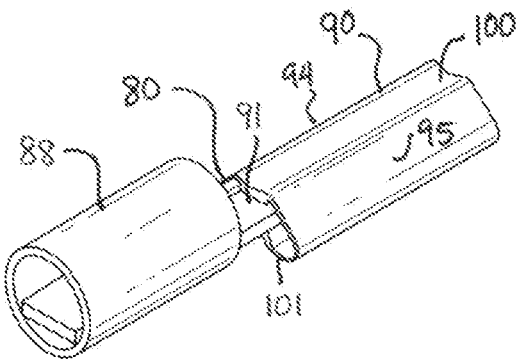
FIGS. 9 and 10 are top perspective and bottom perspective views, respectively, of the coupler of FIG. 8.
Figure 10:
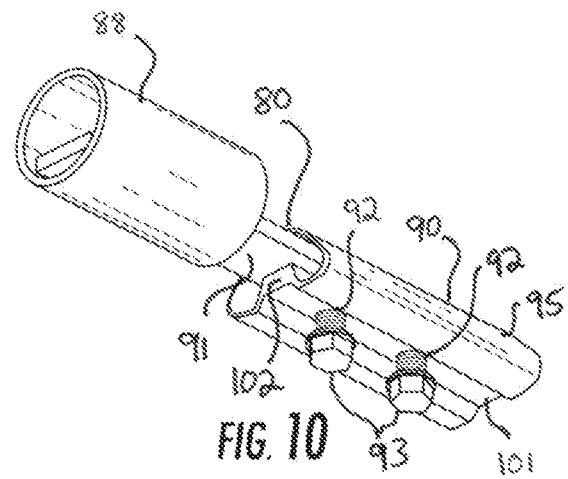

The rail 22 extends between opposed base assemblies 24 and 25, as shown in FIG. 1. The base assemblies 24 and 25 are directed toward each other, and capture and securely hold the rails 22 and 23 therebetween. The base assemblies 24 and 25 are identical in every respect other than location and orientation, and as such, only the base assembly 24 will be described, with the understanding that the discussion of the base assembly 24 applies equally to the base assembly 25, but for location and orientation characteristics which are separately described. Further, the various elements and structural features of the base assembly 25 will carry the same reference characters as those of the base assembly 24, but will be marked with a prime ("'") so as to identify and distinguish the elements and features of the base assembly 25 from the base assembly 24. Turning now to FIGS. 8-10, the base assembly 24 includes two opposed mounts 80, two opposed sleeves 81 for receiving the mounts 80, a brace 82 extending between the sleeves 81, and a post 83 supporting the brace 82. The post 83 is a hollow cylinder extending upward from an open end and terminating at the brace 82. The post 83 is suitable for mounting on a heavy or stable base disposed on the ground, a fixed pole or post, or whatever surface is selected by the grip for arrangement of the scene to be filmed. The brace 82 is a rigid, strong horizontal member having opposed ends 84 and 85. The sleeves 81 are disposed at the ends 84 and 85, and are each formed integrally or welded to the brace 82 at the ends 84 and 85. The sleeves 81 are each short, horizontal tubes having an inner, cylindrical, female engagement area 86 for receiving and holding the mounts 80. Two threaded holes extend through each of the sleeves 81 for accepting a threaded shank of a bolt or set screw 87.

The mounts 80 have a structure similar to the couplers 50. As shown in FIGS. 9 and 10, the mount 80 has a cylindrical fixture defining a male engagement fixture 88 for coupling with the female engagement area 86 in the base assembly 24. The mount 80 further includes a bracket 90, constructed similarly to the coupler 50, mounted to a bar 91 and extending axially outwardly from the from the male engagement fixture 88. The bar 91 is permanently mounted within the male engagement fixture 88, such as by welding, and extends out of the male engagement fixture 88. The bracket 90, like the coupler 50, has two upper faces 94 and 95, a top 100, a lower face 101, and an inner rib 102. Two threaded holes 92 are formed through the lower face 101 for receiving two threaded bolts 93.

To mount the rail 22 to the base assembly 24 as in FIG. 8, the mounts 80 are first secured within the sleeves 81. The male engagement fixture 88 of each mount 80 is passed into the female receiving area 86 of the sleeve 81, and the set screws 87 are tightened onto the male engagement fixture 88, securely and rigidly fixing the mounts 80 within the sleeves 81. The bracket 90 is then available for receiving the rail 22.

Still referring to FIG. 8, the end 31 of the rail member 30 is aligned with and moved over the bracket 90, the bracket 90 is inserted into the end 31 of the rail member 30, and the holes 92 in the bracket 90 are aligned with the holes 52 in the rail member 30. The upper faces 94 and 95 of the bracket 90 are received in juxtaposition against the upper inner surface of the interior 51 of the rail member 30, and the lower face 101 of the bracket 90 is received in juxtaposition against the lower inner surface of the interior 51 of the rail member 30. In this way, the bracket 90 has a loose press fit inside the rail member 30. Threaded bolts 93 are then rotatably applied and threadably engaged to the aligned holes 65 and 92, and a shank of each bolt 93 extends into and past the inner rib 102 of the bracket 90 until the shank contacts the bar 91. The bolt 93 carries a washer encircling the shank proximate to a head of the bolt, and the washer contacts the bottom 40 of the rail member 30. Continued application of the bolt 93 through the holes 65 and 92 causes the washer to tighten against the bottom 40, and urges the shank of the bolt 93 upwards into the bar 91 against the bracket 90, causing the bracket 90 to expand against the rail member 30. Expansion of the bracket 90 against the rail member 30 forms a tight press fit between the bracket 90 and the rail member 30, so that the rail member 30 is secured on the bracket 90 and on the base assembly 24. Both rails 22 and 23 are secured to the base assemblies 24 and 25 in this manner, forming the track assembly 20.

Figure 11:
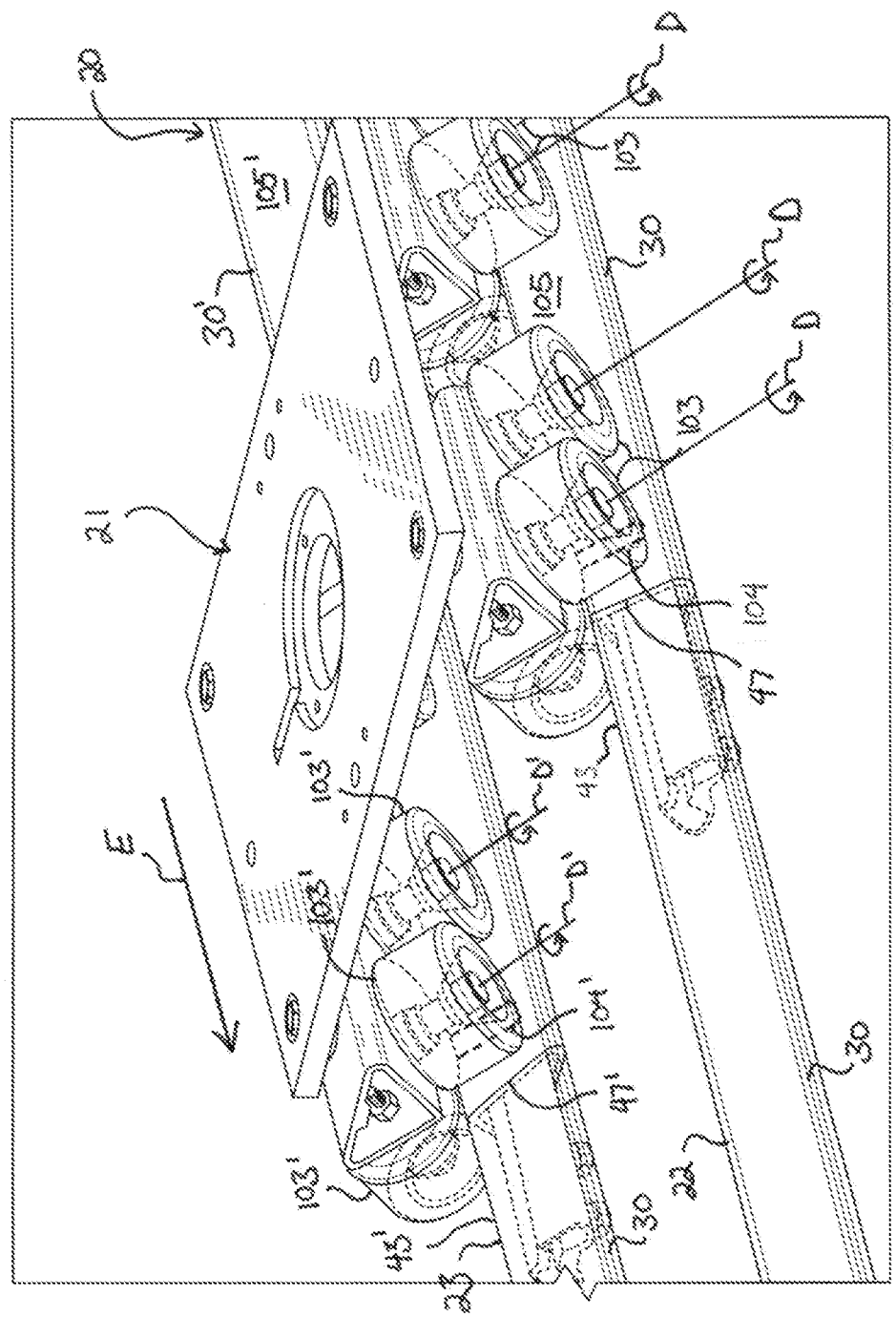
FIG. 11 is an enlarged side perspective view of the camera dolly riding on the rails of FIG. 1.

With the track assembly 20 formed, the track assembly 20 can receive the dolly 21 for rolling movement across the rails 22 and 23. As shown in FIG. 11, the dolly 21 is positioned on top of the rails 22 and 23. The dolly 21 has wheels 103 with rotational axes D oriented in the same plane as the planes A and B (as shown in FIGS. 3 and 4). However, the axes D are offset or angled with respect to the orientation of the seams 47 between the rail members 30, as seen in FIG. 11. As the wheels 103 roll along the track 22, each wheel 103 has a contact area 104 (shown in broken line in FIG. 11) extending across the width of the wheel 103 which is parallel to the axis B and to the planes A and B. This contact area 104 is thin, but does extend across the full width of the wheel 103. The contact area 104 is the site of contact between the dolly 21 and the track 20, and any irregularities in the rails 22 and 23 would be communicated to the dolly as bumps and vibrations when the contact area 104 moves over those irregularities.

As seen in FIG. 11, the rail 22 has a rolling surface 105. The rolling surface 105 includes the outward faces 33 and 34 which are divergent, elongate faces depending from the crown 43. The rolling surface 105 is thus a folded surface having the two outward faces 33 and 34 directed away from each other on a triangular cross-sectioned rail member 30. The rolling surface 105 is severed obliquely by the seam 47.

As the dolly 21 rolls forward on the track 20 in a direction generally indicated by the line E in FIG. 11, the wheels 103 of the dolly 21 roll over the rolling surface 105 and cross the seam 47 at different moments because each wheel 103 is spaced apart. Furthermore, different portions of each wheel 103 cross the seam 47 at different moments because the contact area 104 for each wheel is transverse with respect to the seam 47. The contact area 47 of the leading wheel 103 moves over a portion of the seam 47 that is proximate to the crown 43 first, because the seam 43 is angled. As the contact area 104 advances further along the rail 22, the contact area 104 moves toward a portion of the seam 47 that is proximate to the bottom 40 of the rail member 30. Thus, as the wheel 103 rolls down the rail 22, the contact area 104 moves over the seam 47 gradually from one end of the seam 47 to the other end of the seam 47. The seam 47 is thus introduced gradually to the contact area 104, eliminating any bump or vibration between the wheel and the seam 47. The other wheels 103 progress over the seam 47 in the rail 22 in a similar manner.

Likewise, the wheels 103' roll over the seam 47' in a similar manner, but the seam 47' is directed opposite to the seam 47. In this way, as the wheel 103 rolls over the seam 47 in the rail 22 proximate the crown 43 first, the wheel 103' rolls over the seam 47' in the rail 23 proximate the bottom 40 first, so that the wheels 103 and 103' encounter different portions of the respective seams 47 and 47' at different moments, further reducing any potential jarring or vibration imparted to the dolly 21.

The present invention is described above with reference to a preferred embodiment. However, those skilled in the art will recognize that changes and modifications may be made in the described embodiment without departing from the nature and scope of the present invention. To the extent that such modifications and variations do not depart from the spirit of the invention, they are intended to be included within the scope thereof.

Having fully and clearly described the invention so as to enable one having skill in the art to understand and practice the same, the invention claimed is:

The invention claimed is:

1. A support for a camera dolly, the support comprising:
spaced-apart, opposed first and second rails each having a rolling surface for supporting the camera dolly and extending along the respective first and second rails;
each rolling surface including two divergent elongate faces depending from a common crown of the respective first and second rails; and
each rolling surface is severed by a seam extending transversely across each of the divergent faces of the respective rolling surface and defining a plane aligned obliquely with respect to the respective rolling surface.

2. The support of claim 1, further comprising:
the plane defined by the seam severing the rolling surface of the first rail is a first plane;
the plane defined by the seam severing the rolling surface of the second rail is a second plane; and
the first and second planes are transverse with respect to each other.

3. The support of claim 1, wherein the seams in the first and second rails are directly opposed from each other.

4. The support of claim 3, wherein the seam in the first rail at the crown of the first rail is offset from the seam in the second rail at the crown of the second rail.

5. The support of claim 1, wherein each of the planes are aligned at between approximately seventy degrees and approximately eighty degrees with respect to the first and second rails.

6. The support of claim 1, wherein the first and second rails have triangular cross-sections.

7. The support of claim 1, wherein:
a coupler inside each of the first and second rails joins the first and second rails at each seam, respectively;
each coupler has two opposed upper faces and a bottom; and
bolts extending through each of the rails proximate to the seam move between loosened conditions, defining a loose fit engagement between the coupler and the rail, and tightened conditions, defining a secured engagement in which the faces of the coupler are expanded against the rail.

8. The support of claim 1, wherein the first and second rails are identical and aligned opposite each other.

9. A support for a camera dolly, the support comprising:
a first rail including first rail members joined in longitudinal extension at a first seam;
a second rail including second rail members joined in longitudinal extension at a second seam, the second rail spaced apart from and opposite to the first rail;
the first and second seams are disposed transversely across the first and second rails in a longitudinal seam zone common to both the first and second rails and defined between first and second planes perpendicular to the first and second rails;
the first seam extends through the longitudinal seam zone in a first direction; and
the second seam extends through the longitudinal seam zone in a second direction transverse to the first direction of the first seam.

10. The support of claim 9, wherein:
the first and second rails each have two sides extending between a crown and a bottom opposite the two sides;
the first seam extends through the longitudinal seam zone from the bottom of the first rail at the first end to the crown of the first rail at the second end; and
the second seam extends through the longitudinal seam zone from the bottom of the second rail at the second end to the crown of the second rail at the first end.

11. The support of claim 9, further comprising:
the first seam of the first rail is aligned obliquely with respect to the first rail members; and
the second seam of the second rail is aligned obliquely with respect to the second rail members.

12. The support of claim 9, wherein the first and second rail members have triangular cross-sections.

13. The support of claim 9, wherein the first and second seams are aligned at between approximately seventy degrees and approximately eighty degrees with respect to the first and second rails, respectively.

14. The support of claim 9, wherein the first and second rail members are identical and aligned opposite each other.

15. A support for a camera dolly, the support comprising:
spaced-apart first and second rails comprised of longitudinal rail members;
the first rail has a first seam between the rail members of the first rail;
the first seam in the first rail is directly opposed from a second seam in the between the rail members of the second rail, the first seam thereby corresponding longitudinally to the second seam;
the first and second seams have first and second leading edges formed at crowns of the first and second rails, respectively; and
the leading edge of the first seam is offset longitudinally with respect to the leading edge of the second seam.

16. The support of claim 15, further comprising:
the first seam of the first rail is aligned obliquely with respect to the rail members of the first rail; and
the second seam of the second rail is aligned obliquely with respect to the rail members of the second rail.

17. The support of claim 16, wherein the first seam in the first rail is aligned transverse with respect to the second seam in the second rail.

18. The support of claim 15, wherein the first and second rails have triangular cross-sections.

19. The support of claim 15, wherein the first and second seams are aligned at between approximately seventy degrees and approximately eighty degrees with respect to the first and second rails, respectively.

20. The support of claim 15, wherein the rail members of the first and second rails are identical and aligned opposite each other.

* * * * *